US008407286B2

(12) United States Patent
Punera et al.

(10) Patent No.: US 8,407,286 B2
(45) Date of Patent: Mar. 26, 2013

(54) METHOD AND APPARATUS FOR UTILIZING SOCIAL NETWORK INFORMATION FOR SHOWING REVIEWS

(75) Inventors: Kunal Punera, Mountian View, CA (US); Suju Rajan, Sunnyvale, CA (US)

(73) Assignee: Yahoo! Inc., Sunnyvale, CA (US)

(*) Notice: Subject to any disclaimer, the term of this patent is extended or adjusted under 35 U.S.C. 154(b) by 538 days.

(21) Appl. No.: 12/121,593

(22) Filed: May 15, 2008

(65) Prior Publication Data
US 2009/0287774 A1 Nov. 19, 2009

(51) Int. Cl.
*G06F 15/16* (2006.01)
(52) U.S. Cl. .......................... 709/204; 709/217; 709/203
(58) Field of Classification Search .................. 709/204; 370/260
See application file for complete search history.

(56) References Cited

U.S. PATENT DOCUMENTS

| | | | |
|---|---|---|---|
| 2002/0107853 A1 | 8/2002 | Hofmann et al. | |
| 2004/0098664 A1* | 5/2004 | Adelman et al. | 715/500 |
| 2005/0067492 A1* | 3/2005 | Amitay et al. | 235/385 |
| 2005/0198031 A1* | 9/2005 | Pezaris et al. | 707/9 |
| 2005/0198305 A1* | 9/2005 | Pezaris et al. | 709/227 |
| 2005/0209999 A1* | 9/2005 | Jou | 707/2 |
| 2006/0282762 A1* | 12/2006 | Diamond et al. | 715/511 |
| 2007/0078669 A1* | 4/2007 | Dave et al. | 705/1 |
| 2008/0004943 A1 | 1/2008 | Calabria | |
| 2008/0077574 A1 | 3/2008 | Gross | |
| 2009/0240771 A1* | 9/2009 | Capobianco | 709/204 |
| 2010/0042511 A1* | 2/2010 | Sundaresan et al. | 705/26 |
| 2010/0223066 A1* | 9/2010 | Berger | 705/1.1 |

FOREIGN PATENT DOCUMENTS

WO WO 2007131213 A2 * 11/2007
WO WO 2009105735 A2 * 8/2009

OTHER PUBLICATIONS

Written Opinion of the International Searching Authority for Related Foreign Application PCT/US2009/042623.
International Search Report for Related Foreign Application PCT/US2009/042623.

* cited by examiner

*Primary Examiner* — Wing F Chan
*Assistant Examiner* — Kostas Katsikis
(74) *Attorney, Agent, or Firm* — Stattler-Suh PC

(57) ABSTRACT

A method and apparatus are provided for utilizing social network information to show reviews written by others. In one example, the method includes uploading at least one review written by an entity other than a particular user; filtering the at least one review according to criteria specified by the particular user; and integrating into one central location reviews written by others, wherein the reviews include the at least one review.

10 Claims, 3 Drawing Sheets

METHOD AND APPARATUS FOR UTILIZING SOCIAL NETWORK INFORMATION FOR SHOWING REVIEWS

FIELD OF THE INVENTION

The present invention relates to Internet reviews. More particularly, the present invention relates to using social networks to enhance Internet reviews.

BACKGROUND OF THE INVENTION

Several websites solicit user reviews. Reviews may include recommendations and ratings. Websites such as amazon.com and netfilx.com are domain specific, targeting consumer goods and movies respectively. Other websites such as yelp.com and local.yahoo.com are geared toward user reviews for services such as mechanics, doctors, restaurants etc. Most of these websites allow the user to post their reviews either anonymously or with a user-id. However, none of the existing websites integrate social network information with the reviews. It is true that the service Yahoo!® 360 allows users to integrate their reviews on different Yahoo!® properties such as tech.yahoo.com, local.yahoo.com etc. into their 360 homepages. Unfortunately, such a service does not provide a functionality to search the reviews using information from a social network.

SUMMARY OF THE INVENTION

What is needed is an improved method having features for addressing the problems mentioned above and new features not yet discussed. Broadly speaking, the present invention fills these needs by providing a method and system of utilizing social network information to show reviews written by others. It should be appreciated that the present invention can be implemented in numerous ways, including as a method, a process, an apparatus, a system or a device. Inventive embodiments of the present invention are summarized below.

In one embodiment, a method of utilizing social network information to show reviews written by others is provided. The method comprises uploading at least one review written by an entity other than a particular user, filtering the at least one review according to criteria specified by the particular user, and integrating into one central location reviews written by others, wherein the reviews include the at least one review.

In another embodiment, a method of utilizing social network information to show reviews written by a particular user is provided. The method comprises uploading at least one review written by the particular user, filtering the at least one review according to criteria specified by the particular user, and integrating into one central location reviews written by the particular user.

In still another embodiment, an apparatus for utilizing social network information to show reviews written by others is provided. The apparatus comprises an uploader device configured to upload at least one review written by an entity other than a particular user, a filter device configured filter the at least one review according to criteria specified by the particular user, and an integrator device configured to integrate into one central location reviews written by others, wherein the reviews include the at least one review.

In yet another embodiment, an apparatus for utilizing social network information to show reviews written by a particular user is provided. The apparatus comprises a uploader device configured to upload at least one review written by the particular user, a filter device configured to filter the at least one review according to criteria specified by the particular user, and an integrator device configured to integrate into one central location reviews written by the particular user.

In still yet another embodiment, a computer readable medium carrying one or more instructions for utilizing social network information to show reviews written by others is provided. The one or more instructions, when executed by one or more processors, cause the one or more processors to perform the steps of uploading at least one review written by an entity other than a particular user, filtering the at least one review according to criteria specified by the particular user, and integrating into one central location reviews written by others, wherein the reviews include the at least one review.

The invention encompasses other embodiments configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE INVENTION

An invention for a method and apparatus for utilizing social network information to show reviews written by others is disclosed. Numerous specific details are set forth in order to provide a thorough understanding of the present invention. It will be understood, however, to one skilled in the art, that the present invention may be practiced with other specific details.
General Overview Several websites solicit user reviews for various targets (e.g., restaurants, movies, consumer electronics, etc.). Reviews may include recommendations and ratings. There is some benefit to knowing the general public opinion of a particular target. However, sometimes it is better to use the reviews of trusted sources (e.g., friends and family). For instance, a referral for a doctor or a mechanic, reviews for a particular type of cuisine are more relevant coming from people whom we trust rather than a stranger.

Figure 1:
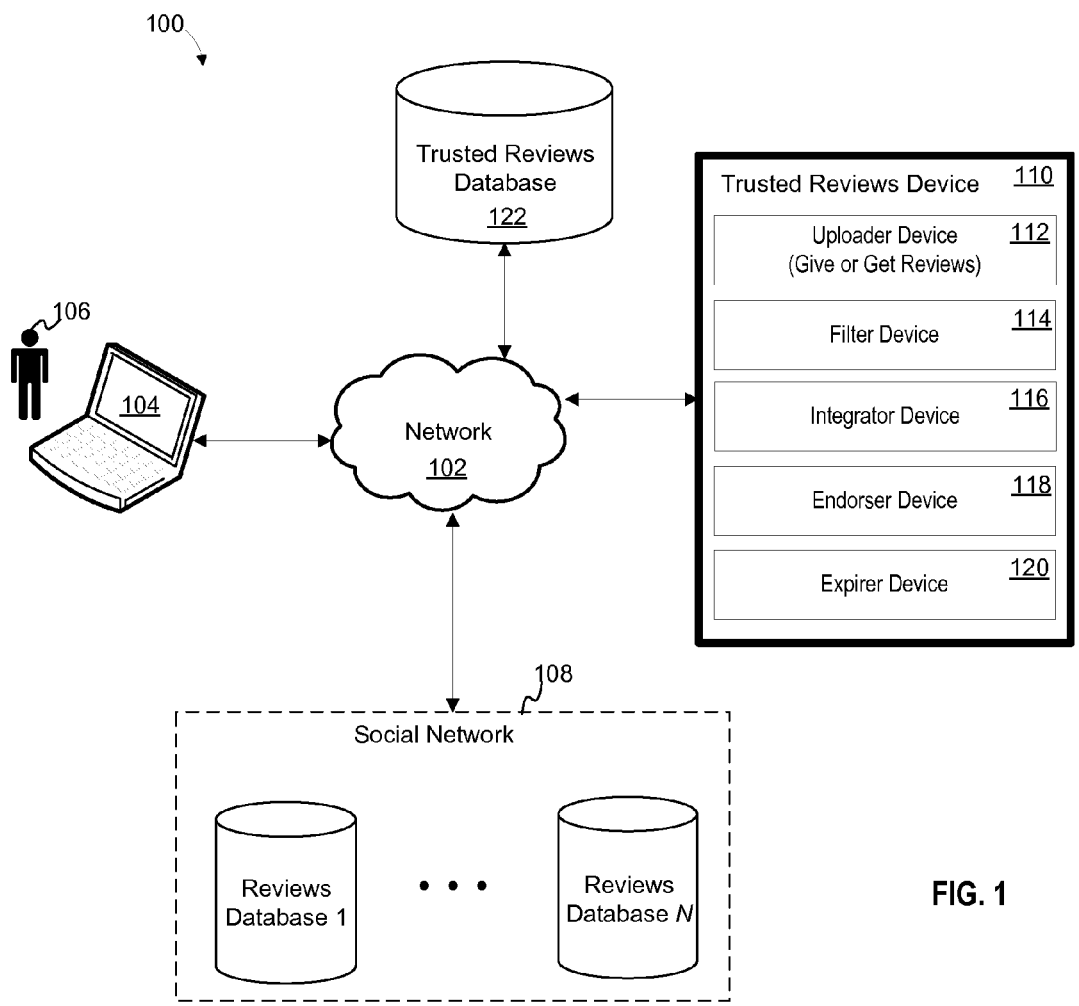
FIG. 1 is a block diagram of a system for utilizing social network information for showing reviews, in accordance with an embodiment of the present invention.

FIG. 1 is a block diagram of a system 100 for utilizing social network information for showing reviews, in accordance with an embodiment of the present invention. A device of the present invention is hardware, software or a combination thereof. A device may sometimes be referred to as an apparatus. Each device is configured to carry out one or more steps of the method of utilizing social network information for showing reviews.

The network 102 couples together a user computer 104, a social network 108, a trusted reviews device 110 and a trusted reviews database 122. The network 102 may be any combination of networks, including without limitation the Internet, a local area network, a wide area network, a wireless network and a cellular network. The social network 108 includes without limitation N reviews databases. Each reviews database is coupled to a website, such as Y!® Messenger, facebook.com, myspace.com or amazon.com, that is configured to gather reviews from users. The trusted reviews device 110 includes without limitation an uploader device 112, a filter device 114, an integrator device 116, an endorser device 118 and an expirer device 120. The trusted reviews device 110 is preferably located inside a front-end server (i.e., web server).

Alternatively, one apparatus may contain two or more devices of the system 100. One apparatus may contain, for example, the trusted reviews device 110 and the trusted reviews database 122.

The system 100 utilizes the social network 108 to show reviews. Whenever a user 106 writes a particular review, the system 100 allows the user 106 flag the review as public or being directed at specific friends. The system 100 then allows any user to filter existing reviews by the user-ids of the user's friends in the user's social network graph. For instance, a user 106 can choose to view the reviews for a dentist from friends who are in the user's Y!® Messenger graph.

Consider a user 106 who is new to a city and wants to identify a dentist. The user 106 can look up dentist reviews on yelp.com or local.yahoo.com. However, the user 106 cannot trust these anonymous reviews. The reviews could have been posted by the dentist himself! In contrast, if the user 106 had some friends who live or lived in the city and who had posted some reviews of the dentist, the user 106 could use the system 100 to filter out the reviews from strangers and use only the reviews from the user's friends to make the user's choice. This scenario applies to any service industry, including without limitation auto mechanics, plumbing, cleaning services, etc.

Consider a user 106 who wants to buy a particularly expensive digital camera. The user 106 could read the general user reviews and get a fairly decent idea about the camera. However, it would be of more value to the user 106 to use the reviews from say his friends in his photography class. He could then open up his social network, such as Y!® Messenger graph, facebook.com, or myspace.com, and highlight the user-ids of the friends who have reviews in which the user 106 is interested. The system 100 could then filter out the remaining reviews and display only those that are of interest to the user who could then make a more informed decision.

System Details

The description above defines the problem of utilizing social network information to show user reviews, which may include recommendations and ratings. A feature of the system 100 is to allow a user to write reviews and flag them as, for example, "public", "friends only" or "private." The system 100 then surfaces the appropriate reviews when the intended recipients research a particular target object.

The uploader device 112 allows the user 106 to upload a review to the trusted reviews database 122. The review is preferably in the form of text, audio or video files for a particular target product. The user 106 is either giving the review or getting the review. The user can use the uploader device 112 to upload an original review on the spot. Alternatively, the user 106 uploads a review from the social network 108 that was previously authored by the user 106 or by someone else. The uploader device 112 allows the user 106 to mark the review as, for example, "private", or "shared with friends", "friends of friends", "public" or any arbitrary group of friends as specified by the composer of the review. The composer of the review may be the user or someone other than the user. Further, the uploader device 112 may also allow the user 106 to set upload criteria based on substantially any category imaginable. For example, the uploader device 112 can be configured to allow the user to select reviews based on demographics, including without limitation age, sex, location and interests of the reviewer. The uploader device 112 can also be configured to allow the user to select reviews written in certain geographical locations. Accordingly, the uploader device 112 can detect manually inputted reviewer location information, or the uploader device 112 can detect IP (Internet Protocol) addresses attached to reviews.

The user 106 may want to research a particular target. The filter device 114 allows the user 106 to choose to view only those reviews that the user 106 wrote, that are a subset of his friends' or their friends' reviews, or that are the default option of reviews written by the general public. The filter device 114 may also allow the user 106 to set criteria based on substantially any category imaginable. For example, the filter device 114 can be configured to allow the user to select reviews based on demographics, including without limitation age, sex, location and interests of the reviewer. The filter device 114 can also be configured to allow the user to select reviews written in certain geographical locations.

The integrator device 116 gives the user 106 the option of integrating their reviews on different sites into one common place. For instance, the integrator device 116 can be configured to provide the user 106 the option of hosting in one place reviews from amazon.com, netflix.com, local.yahoo.com, and yelp.com. Such a centralized system allows for better management.

A user 106 often does not always want to write a review from scratch when other reviews, which echo their opinions, already exist. In such cases, the endorser device 118 can be configured to allow the user 106 to endorse previously written reviews (e.g., on yahoo.com or other websites). The trusted reviews device 110 can then present these reviews to the user's friends as trusted reviews.

The expirer device 120 allows a user 106 to specify an expiration date for each review. This feature lets the user 106 leave time dependent reviews for the user 106 or for the user's friends. For example, a review about a food festival at a restaurant is time dependent.

Method Outline

Figure 2:
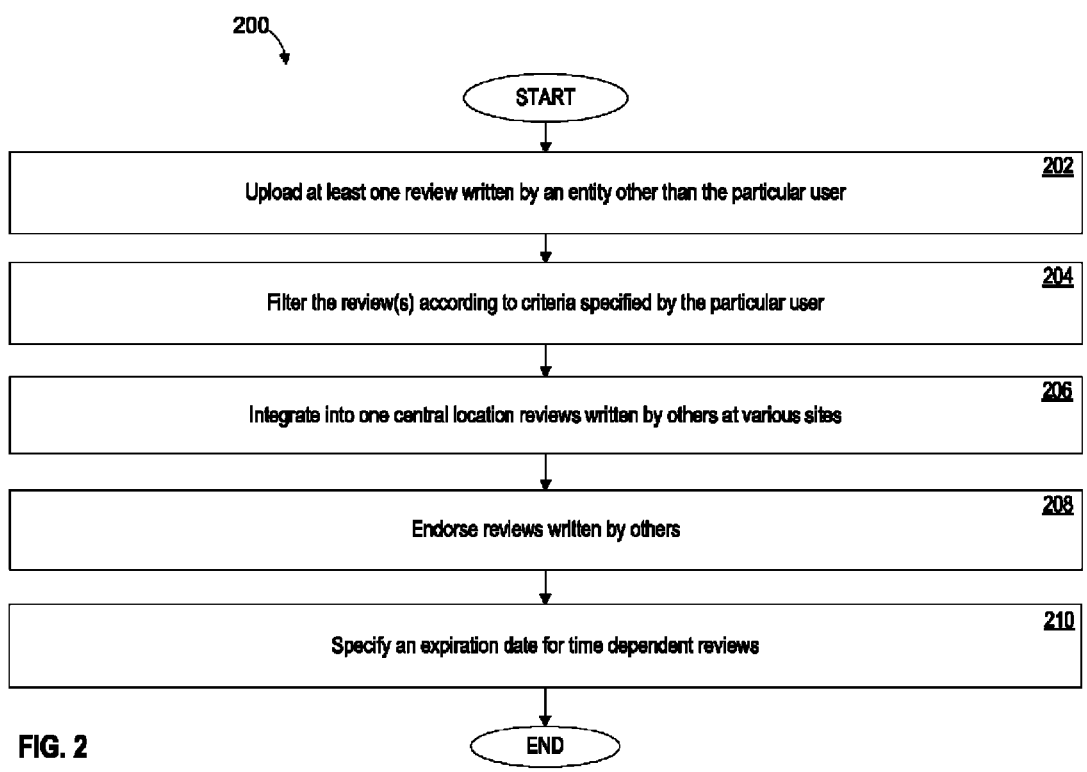
FIG. 2 is a flowchart of a method for utilizing social network information to show reviews written by others, in accordance with an embodiment of the present invention.

FIG. 2 is a flowchart of a method 200 for utilizing social network information to show reviews written by others, in accordance with an embodiment of the present invention. The method 200 starts in step 202 where the system uploads at least one review written by an entity other than the particular user. The uploader device 112 of FIG. 1 may be configured to carry out this step 202. The method 200 then moves to step 204 where the system filters the reviews according to criteria specified by the particular user. The filter device 114 of FIG. 1 may be configured to carry out this step 204. Next, in step 206, the system integrates into one central location reviews written by others from various sites. The integrator device 116 of FIG. 1 may be configured to carry out this step 206. The method 200 then proceeds to step 208 where the system endorses reviews written by others. The endorser device 118 of FIG. 1 may be configured to carry out this step 208. In step 210, the system allows the user to specify expiration dates for time dependent reviews. The expirer device 120 of FIG. 1 may be configured to carry out this step 210. The method 200 is then at an end.

Figure 3:
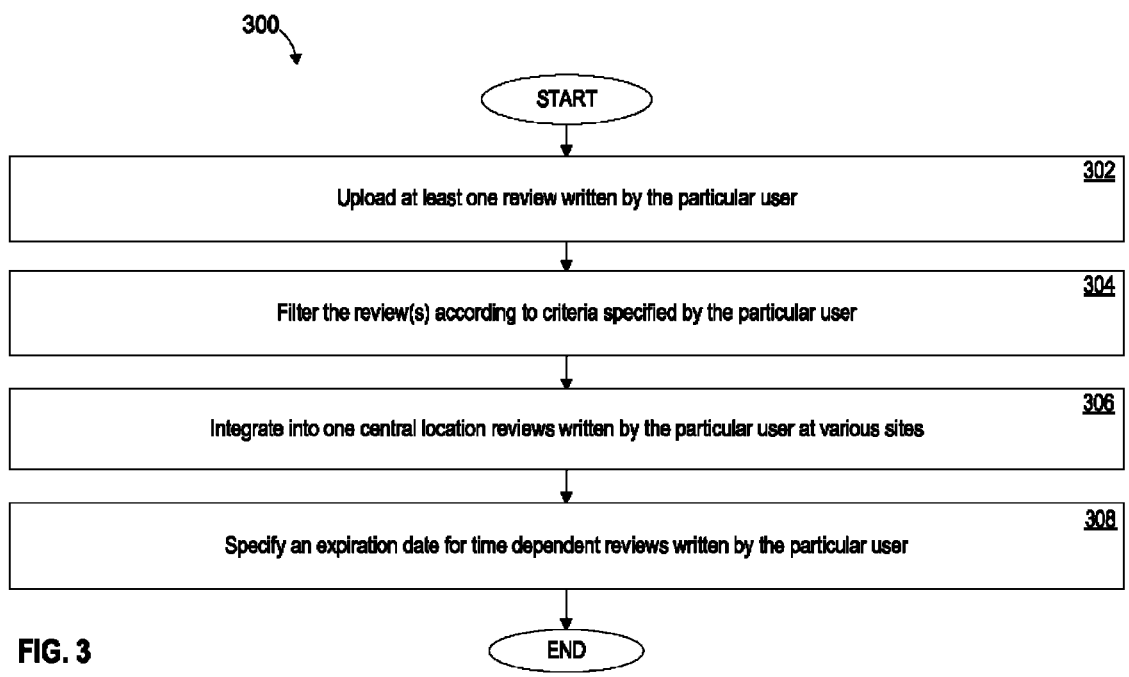
FIG. 3 is a flowchart of a method for utilizing social network information to show reviews written by a particular user, in accordance with an embodiment of the present invention.

FIG. 3 is a flowchart of a method 300 for utilizing social network information to show reviews written by a particular user, in accordance with an embodiment of the present invention. The method 300 starts in step 302 where the system uploads at least one review written by the particular user. The uploader device 112 of FIG. 1 may be configured to carry out this step 302. The method 300 then moves to step 304 where the system filters the reviews according to criteria specified by the particular user. The filter device 114 of FIG. 1 may be configured to carry out this step 304. Next, in step 306, the system integrates into one central location reviews written by the particular user from various sites. The integrator device 116 of FIG. 1 may be configured to carry out this step 306. In step 308, the system allows the user to specify expiration dates for time dependent reviews. The expirer device 120 of FIG. 1 may be configured to carry out this step 308. The method 300 is then at an end.

Note that method 200 involves reviews written by others and that the method 300 involves reviews written by the particular user. The system may carry out method 200 of FIG. 2 and method 300 of FIG. 3 at substantially the same time and not exclusively of each other. For example, the system may integrate at one time the reviews of others and the reviews of the particular user.

Computer Readable Medium Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application-specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVDs, CD-ROMs, micro-drives, and magnetooptical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of non-transitory media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including without limitation uploading at least one review written by an entity other than a particular user, filtering the at least one review according to criteria specified by the particular user, and integrating into one central location reviews written by others, wherein the reviews include the at least one review, according to processes of the present invention.

Advantages

Allowing social network information to be utilized to show reviews allows users to trust better the reviews and make more informed decisions. The system of the present invention adds highly useful filtering criteria that ease sifting through tons of irrelevant reviews.

Giving users the option to integrate their reviews from external sources as well as endorse reviews written by others ensures that a large fraction of the users get the benefits of trusted reviews. These integration and endorsement features may be particularly useful when the system is launched when review systems are known to suffer from "cold-start" problems. Further, the expiration date feature prevents the system from getting cluttered with outdated reviews.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method of sharing reviews, the method comprising:

connecting, using a computer, an aggregator site to a plurality of social networking sites;

identifying, using a computer, a plurality of relationships within the social networking sites among a plurality of friends in the social networking sites;

receiving, at the aggregator site, using a computer, at least one review provided by at least one reviewer, wherein the reviewer comprises a user of at least one social networking site;

receiving, at the aggregator site, using a computer, designations of friends within each of the social networking sites permitted by the reviewer to access the review;

uploading, using a computer, the review and the designations to the social networking sites;

receiving, using a computer, search criteria at the aggregator site from at least one requester;

selecting, using a computer, at least one searched review, wherein the searched review meets the search criteria and the requester corresponds to a friend designated by the reviewer as having permission to access the searched review;

storing, using a computer, the searched review in a trusted reviews database; and presenting, using a computer-implemented visual interface, the searched review to the requester.

2. The method of claim 1, wherein the review is authored by another user of the social networking site and is at least one of endorsed by the reviewer and uploaded to the aggregator site by the reviewer.

3. The method of claim 1, further comprising specifying an expiration date for the review.

4. The method of claim 1, wherein the review is authored by the reviewer.

5. The method of claim 1, wherein the search criteria comprises at least one of:

demographics;

manually inputted reviewer location information; and recorded Internet Protocol addresses.

6. A non-transitory computer readable medium for storing one or more instructions for sharing reviews, wherein the one or more instructions, when executed by one or more processors, cause the one or more processors to perform the steps of:

connecting an aggregator site to a plurality of social networking sites;

identifying a plurality of relationships within the social networking sites among a plurality of friends in the social networking sites;

receiving at the aggregator site at least one review provided by at least one reviewer, wherein the reviewer comprises a user of at least one social networking site;

receiving at the aggregator site designations of friends within each of the social networking sites permitted by the reviewer to access the review;

uploading the review and the designations to the social networking sites;

receiving search criteria at the aggregator site from at least one requester;

selecting at least one searched review, wherein the searched review meets the search criteria and the requester corresponds to a friend designated by the reviewer as having permission to access the searched review;

storing the searched review in a trusted reviews database; and presenting the searched review to the requester.

7. The non-transitory computer readable medium of claim 6, wherein the review is authored by another user of the social networking site and is at least one of endorsed by the reviewer and uploaded to the aggregator site by the reviewer.

8. The non-transitory computer readable medium of claim 6, wherein the steps further comprise specifying an expiration date for the review.

9. The non-transitory computer readable medium of claim 6, wherein the review is authored by the reviewer.

10. The non-transitory computer readable medium of claim 6, wherein the search criteria comprises at least one of:
   demographics;
   manually inputted reviewer location information; and
   recorded Internet Protocol addresses.

* * * * *